United States Patent [19]

Davis

[11] Patent Number: 4,921,720
[45] Date of Patent: May 1, 1990

[54] METHOD FOR PREPARING FOOD ITEMS FROM PIG SNOUTS AND OTHER SIMILAR MATERIAL

[76] Inventor: Edward E. Davis, 4265 San Francisco Ave., St. Louis, Mo. 63115

[21] Appl. No.: 315,495

[22] Filed: Feb. 27, 1989

[51] Int. Cl.⁵ ............................................. A23L 1/312
[52] U.S. Cl. ................................... 426/641; 426/393; 426/438; 426/509; 426/524
[58] Field of Search ............... 426/438, 641, 393, 509, 426/524

[56] References Cited

U.S. PATENT DOCUMENTS

| | | | |
|---|---|---|---|
| 2,947,635 | 8/1960 | Paynter et al. | 426/438 X |
| 2,983,619 | 5/1961 | Shaw et al. | 426/393 X |
| 3,397,993 | 8/1968 | Strong | 426/438 X |
| 3,685,308 | 8/1972 | Lundquist | 426/393 X |
| 3,709,698 | 1/1973 | Davis | 426/438 X |
| 4,163,804 | 8/1979 | Meyer et al. | 426/641 X |
| 4,262,028 | 4/1981 | Meyer et al. | 426/641 X |
| 4,812,320 | 3/1989 | Ruzek | 426/393 |

*Primary Examiner*—Arthur L. Corbin
*Attorney, Agent, or Firm*—Rogers, Howell & Haferkamp

[57] ABSTRACT

A method of preparing crispy barbecued snouts, beef tripe or pig ears and skins, and the products thereof, including: in all products trim off excess fat from the lean meat, cover the lean meat with water and boil for about 20-30 minutes, season it while keeping water in and over the products, and boil for another two hours. Allow the boiled product to cool, place it on a platter, and freeze it. This frozen product then may be kept for a long period of time in the frozen state, wrapped and packaged to avoid freezer burn. When it is desired to use the product, it can be put into deep frying fat for 15-30 minutes, removed and put in a sauce and served.

5 Claims, No Drawings

METHOD FOR PREPARING FOOD ITEMS FROM PIG SNOUTS AND OTHER SIMILAR MATERIAL

BACKGROUND AND SUMMARY OF THE INVENTION

The present invention relates to crispy snouts, tripe, pig ears, pig skins and the like. These may be prepared by the method in applicant's prior U.S. Pat. No. 3,709,698 which shows a method of making the crispy products. The method there described consists of removing the tendons running from the forehead to the tip of the nose of snouts. From all the products, the excess fat and lean meat are trimmed out. The products are immersed in water and boiled for about thirty minutes, seasoned and then thereafter boiled for two or three hours after which they are cooked in deep fat for fifteen or twenty minutes until they are crisp and ready to serve, usually with barbecue sauce and the like.

Problems with this procedure, however, are that it takes several hours to perform and so it is impractical to use it under many circumstances. Furthermore, the product itself when finally crisped, cannot be left around for many hours before it loses its crispness. The foregoing problems have made it difficult to use the products in, for example, restaurants and the like, or even at home. It requires too much time.

Applicant is aware of the problems and has sought to overcome them. He has learned that a frozen product can be prepared, which can be stored in the freezer cabinet for long periods of time, and then can be finished and served in a few minutes. It cannot, however, be completely prepared and then frozen, because the applicant has learned that it quickly loses its crispness upon reheating, and that indeed if it is re-heated in a microwave oven, it tends to explode by the converting into steam of the water present.

To overcome the problems, the applicant has learned that by performing the process up to a certain point, then freezing it, the product can then be preserved in frozen state. Then when it is needed, it can be finished in the deep fat frying to become crisp and ready for eating.

This deep fat frying step takes only a relatively short period of time, such as fifteen or twenty minutes, and thus the product can be offered in restaurants and the like as well as at home in only a short while after it is called for.

DESCRIPTION OF THE PREFERRED EMBODIMENT

If the product to be frozen consists of snouts, first the two main tendons running from the forehead to the tip of the nose are cut out. Then from all of the products, the excess fat is trimmed out. The lean meat is then immersed in water, boiled for about thirty minutes, after which it is seasoned with a mixture of salt, red pepper, garlic powder, etc. Then when it is completely covered with water in the pot, it is boiled for substantially another two hours.

The foregoing product, which is in intermediate, is then allowed to cool, and then is placed on a platter and frozen for from four to six hours. After freezing is completed, it is wrapped and packaged to avoid freezer burn, the size of the package varying with the market scheme, usually from one to ten pounds each. Then it is put in the freezer where it can be preserved for as long as it is desired to do so.

When the product is needed, it is withdrawn from the freezer, transferred in small batches to a deep fat fryer at about 375° F. for from five to ten minutes to firm the material. When it is desired to have the products crisp as in connection with snouts, they are submerged into the deep fat fryer basket from fifteen to twenty minutes more, after which they can be drained and served. They usually then will be served with barbecue sauce.

Thus the product can be practical for serving at restaurants as it can be offered in about twenty to thirty minutes after it is needed.

The frozen product and the process of making it, as well as the final process, are particularly useful for commercial sale at restaurants and the like. The initial products could be made at a central location and frozen and delivered in that stage to local restaurants or to homes or to grocery stores. Thereafter it can be thawed by the local user and crisped in the deep fat frying step.

What is claimed is:

1. A method of preparing food items from material selected from the group consisting of pig snouts, pig ears, pig skins and beef tripe, consisting essentially of: trimming excess fat from the material; boiling the trimmed material in water; seasoning the boiled material and continuing to boil the seasoned material for about two hours; withdrawing the seasoned material from the boiling water; allowing the material to cool; placing the material on a platter and into a freezer and freezing it from about four to six hours; and after freezing is completed, wrapping and packaging the material to avoid freezer burn, then placing it back into the freezer to be preserved.

2. The method of claim 1 including withdrawing the product of claim 1 from the freezer after it has been placed back into the freezer, putting it into a deep fat fryer at about 375° F. and deep fat frying it for substantially five to ten minutes to firm the material.

3. The method of claim 2, thereafter transferring the thus processed material to a covered deep fry basket, and returning the basket to the deep fat fryer for fifteen to twenty minutes to make the material crisp and ready for serving.

4. The method of claim 1 in which the material is pig snouts and the two main tendons are cut out prior to any boiling of the material.

5. A method of preparing food items from material selected from the group consisting of pig snouts, pig ears, pig skins, and beef tripe, consisting essentially of: trimming excess fat from the material; boiling the trimmed material in water, continuing to boil the trimmed material for about two hours; withdrawing the trimmed material from the boiling water; allowing the trimmed material to cool; placing it on a platter and into a freezer and freezing it from about four to six hours; and after freezing is completed, wrapping and packaging the material to avoid freezer burn, and then placing it back into the freezer to be preserved.

* * * * *